United States Patent
Seto

(10) Patent No.: US 7,180,311 B2
(45) Date of Patent: Feb. 20, 2007

(54) PHYSICAL QUANTITY SENSING DEVICE WITH BRIDGE CIRCUIT AND ZERO POINT ADJUSTING METHOD

(75) Inventor: Kenji Seto, Shizuoka (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 11/130,954

(22) Filed: May 17, 2005

(65) Prior Publication Data

US 2005/0264305 A1  Dec. 1, 2005

(30) Foreign Application Priority Data

May 31, 2004  (JP) ............... 2004-161672

(51) Int. Cl.
  *G01R 17/10* (2006.01)
  *G01R 27/08* (2006.01)
(52) U.S. Cl. ............ 324/725; 324/706; 324/526
(58) Field of Classification Search ......... 324/706, 324/725
  See application file for complete search history.

(56) References Cited

U.S. PATENT DOCUMENTS

| | | | |
|---|---|---|---|
| 4,300,395 A * | 11/1981 | Shirouzu et al. ......... | 73/708 |
| 4,710,730 A * | 12/1987 | Doyle, III ............. | 331/116 FE |
| 5,307,690 A | 5/1994 | Hanazawa | |
| 5,345,184 A * | 9/1994 | Andoh ................ | 324/720 |
| 5,850,850 A * | 12/1998 | Mudd ................. | 137/486 |
| 6,489,787 B1 * | 12/2002 | McFadden ............ | 324/725 |
| 6,543,569 B1 * | 4/2003 | Shimizu et al. ........ | 180/444 |
| 6,966,232 B2 * | 11/2005 | Asaumi et al. ......... | 73/862.333 |
| 2002/0047460 A1 * | 4/2002 | Yoneda et al. ......... | 310/216 |

FOREIGN PATENT DOCUMENTS

| | | |
|---|---|---|
| JP | 05-060627 | 3/1993 |
| JP | 05-45537 | 6/1993 |
| JP | 07-2943 | 1/1995 |

(Continued)

OTHER PUBLICATIONS

Kenji Seto, "Physical Quantity Sensing Device With Bridge Circuit and Temperature Compensating Method," U.S. Appl. No. 11/131,768, filed on May 18, 2005.

*Primary Examiner*—Andrew H. Hirshfeld
*Assistant Examiner*—John Zhu
(74) *Attorney, Agent, or Firm*—Keating & Bennett, LLP

(57) ABSTRACT

A physical quantity sensing device includes a bridge circuit that has first and second input points, to which an AC voltage is applied, and first and second output points connected to a differential amplifier. The bridge circuit includes a first bridge arm for electrically connecting the first input point to the first output point, a second bridge arm for electrically connecting the first output point to the second input point, a third bridge arm for electrically connecting the first input point to the second output point and a fourth bridge arm for electrically connecting the second output point to the second input point. The first bridge arm includes a first sensor element, of which the impedance changes with a physical quantity to be measured, and the second bridge arm includes a second sensor element, of which the impedance also changes with the physical quantity to be measured. The total impedance of the first and second bridge arms is smaller than that of the third and fourth bridge arms.

19 Claims, 9 Drawing Sheets

FOREIGN PATENT DOCUMENTS

| | | |
|---|---|---|
| JP | 08-035891 | 2/1996 |
| JP | 10-261128 | 9/1998 |
| JP | 2001-050828 | 2/2001 |
| JP | 2001-356059 | 12/2001 |
| JP | 2003-227765 | 8/2003 |

* cited by examiner

PHYSICAL QUANTITY SENSING DEVICE WITH BRIDGE CIRCUIT AND ZERO POINT ADJUSTING METHOD

BACKGROUND OF THE INVENTION

1. Field of the Invention

The present invention relates to a physical quantity sensing device with a bridge circuit and more particularly relates to a sensing device that includes a pair of sensor elements, the impedance of which changes with a physical quantity to be measured. As used herein, the "physical quantity" is any quantity that can be measured with sensor elements, and refers to any of a broad variety of quantities such as forces (various forces including torque load), current, voltage, light quantity, and temperature.

2. Description of the Related Art

Magnetostrictive load sensing devices, including magnetostrictive sensor elements, have been developed for many years. A magnetostrictive sensor element is an element made of a magnetostrictive material, the initial permeability of which changes with the given load, and senses a variation in the initial permeability of the magnetostrictive material as a variation in the impedance (e.g., inductance and resistance) of a sensing coil, for example. Examples of preferred magnetostrictive materials include magnetic materials, soft magnetic materials and ultramagnetic materials such as ferrous alloys, iron-chromium based alloys, iron-nickel based alloys, iron-cobalt based alloys, pure iron, iron-silicon based alloys, iron-aluminum based alloys, and permalloys.

FIG. 1A is an equivalent circuit diagram showing a typical sensing circuit in a conventional magnetostrictive load sensing device. The bridge circuit shown in FIG. 1A has first and second input points N1 and N2, to which an AC voltage (or alternating current) is supplied, and first and second output points S1 and S2, which are connected to a differential amplifier (not shown). The AC voltage is supplied to the first and second input points N1 and N2 from an AC voltage generator 10.

In the bridge circuit shown in FIG. 1A, magnetostrictive sensor elements SE1 and SE2 are connected in parallel to each other. A bridge circuit of this type will be referred to herein as a "parallel bridge circuit". Load sensing devices with such a parallel bridge circuit are described in Japanese Patent Application Laid-Open Publications Nos. 5-60627, 10-261128 and 2001-356059 and Japanese Utility Model Application Laid-Open Publication No. 5-45537, for example.

In a parallel bridge circuit, if the pair of magnetostrictive sensor elements thereof had significantly different initial permeabilities, then the equilibrium point under no load and the output sensitivity under load would be inconsistent so as to decrease the accuracy and reliability of the resultant sensor element value. That is why those unwanted effects, caused by such a significant difference in initial permeability between the magnetostrictive sensor elements, need to be reduced.

One of the most effective methods for reducing those effects caused by such a difference in initial permeability is to increase the amount of alternating current (i.e., exciting current) flowing through the bridge circuit.

However, when the conventional parallel bridge circuit is adopted, it is very difficult to increase the amount of the exciting current for the purpose of reducing the variation in the characteristic of the magnetostrictive sensor elements. The reasons are as follows.

In the parallel bridge circuit shown in FIG. 1A, the magnitude of the fixed resistance of the bridge circuit needs to be substantially equal to the resistance value (or impedance) of the magnetostrictive sensor elements SE1 and SE2 to expand the measurable load range (i.e., sensing range) thereof. A magnetostrictive sensor element normally has an impedance of about 100 Ω or less, and therefore, the magnitude of the bridge resistance is usually fixed at around 100 Ω. For that reason, it is difficult to further increase the impedance of the bridge circuit.

On the other hand, if the impedance variation that has been produced in the parallel bridge circuit affected the oscillator (not shown) of the AC voltage generator 10, then the output AC signal of the oscillator would have a varied oscillation waveform. To avoid this problem, an operational amplifier or any other suitable circuit component needs to be inserted between the oscillator and the parallel bridge circuit so as to function as a buffer amplifier. If such a circuit configuration is adopted, then the output AC voltage of the oscillator reaches the parallel bridge circuit by way of the operational amplifier. As a result, the impedance variation in the parallel bridge circuit does not affect the oscillator anymore. However, due to the performance limits of the operational amplifier, the amount of exciting current that can be supplied to the parallel bridge circuit is several tens of mA (milliamperes) at most. On top of that, current flows symmetrically in the parallel bridge circuit. That is why the amount of exciting current flowing through each of the two magnetostrictive sensor elements SE1 and SE2 decreases to half of the amount of exciting current that was supplied to the input points N1 and N2.

For these reasons, it is very difficult to significantly reduce the unwanted effects caused by the variations in sensor element characteristic by increasing the amount of exciting current flowing through each of the magnetostrictive sensor elements SE1 and SE2.

Also, if the magnetostrictive sensor elements have an extremely low impedance, then a resistor needs to be further inserted between the bridge circuit and the operational amplifier and the amount of current should be limited such that the operational amplifier would not cause output saturation. As a result, the voltage applied to the bridge circuit further decreases and the load sensing range becomes even narrower.

Meanwhile, when a bridge circuit is made up of magnetostrictive sensor elements, zero point adjustment needs to be carried out in order to compensate for the difference in initial permeability between the magnetostrictive sensor elements. In the parallel bridge circuit disclosed in Japanese Utility Model Application Laid-Open Publication No. 7-2943, the zero point adjustment is done by controlling the resistance values of variable resistors that are connected in series to the respective magnetostrictive sensor elements. However, it is not possible to strike a complete balance by such a zero point adjustment as will be described later.

Magnetostrictive sensor elements are excited with alternating current. Thus, to achieve complete balancing, the imbalance in impedance needs to be reduced to zero both in the real and imaginary parts alike. According to a conventional zero point adjustment method, however, the impedance imbalance can be eliminated from just one of the real and imaginary parts, not both. For that reason, even if the zero point adjustment is done so as to minimize the output voltage under no load, a residual voltage will always be generated, which then produces a difference in the output characteristic of the two magnetostrictive sensor elements. Besides, since the output voltage under no load is not zero, the output voltage will have a narrower dynamic range. As described above, the conventional bridge circuit cannot achieve the complete balancing and guarantees only insufficient measuring accuracy.

SUMMARY OF THE INVENTION

In order to overcome the problems described above, preferred embodiments of the present invention reduce the unwanted effects caused by the difference in output characteristic between a pair of sensor elements in a physical quantity sensing device including an AC bridge circuit.

The preferred embodiments of the present invention also provide a physical quantity sensing device that achieves complete balancing in a bridge circuit and that minimizes the shift of the complete equilibrium point with time.

A physical quantity sensing device according to a preferred embodiment of the present invention preferably includes a bridge circuit that has first and second input points, to which an AC voltage is applied, and first and second output points, which are connected to a differential amplifier. The bridge circuit preferably includes a first bridge arm for electrically connecting the first input point to the first output point, a second bridge arm for electrically connecting the first output point to the second input point, a third bridge arm for electrically connecting the first input point to the second output point, and a fourth bridge arm for electrically connecting the second output point to the second input point. The first bridge arm preferably includes a first sensor element, the impedance of which changes with a physical quantity to be measured, and the second bridge arm preferably includes a second sensor element, the impedance of which also changes with the physical quantity to be measured. The total impedance of the first and second bridge arms is preferably smaller than that of the third and fourth bridge arms.

In one preferred embodiment of the present invention, each of the first and second sensor elements is preferably a magnetostrictive sensor element, the impedance of which changes according to a given load, and the physical quantity to be measured is preferably a load that has been placed on one of the first and second sensor elements.

In this particular preferred embodiment, the first sensor element is preferably a first magnetostrictive sensor element including a first magnetostrictive member made of a magnetostrictive material and a first coil surrounding the first magnetostrictive member. The first coil preferably electrically connects the first input point and the first output point together. The second sensor element is preferably a second magnetostrictive sensor element including a second magnetostrictive member made of the magnetostrictive material and a second coil surrounding the second magnetostrictive member. The second coil preferably electrically connects the first output point and the second input point together.

In another preferred embodiment, the total impedance of the first and second bridge arms is preferably at most approximately 90% of that of the third and fourth bridge arms.

In still another preferred embodiment, at least one of the first and second bridge arms preferably includes a balancing variable resistor.

In yet another preferred embodiment, the bridge circuit preferably further includes a balancing variable resistor, which is connected in series between the first and second sensor elements, and the first output point is preferably connected to the balancing variable resistor.

In a specific preferred embodiment, the bridge circuit preferably further includes a second balancing variable resistor, which is connected in series between the third and fourth bridge arms, and the second output point is preferably connected to the second balancing variable resistor.

In this particular preferred embodiment, while the sensing device is performing a measuring operation, preferably substantially no current flows between the first output point and the differential amplifier and between the second output point and the differential amplifier.

In yet another preferred embodiment, the physical quantity sensing device preferably further includes an AC voltage generator for generating the AC voltage applied to the first and second input points of the bridge circuit. The AC voltage generator and the differential amplifier, connected to the first and second output points, are preferably integrated together on the same electronic circuit board.

More specifically, the AC voltage generator preferably includes an oscillator and an amplitude limiter for limiting the amplitude of an output signal of the oscillator.

In yet another preferred embodiment, the physical quantity sensing device preferably includes a sensing circuit section that includes the differential amplifier. Even if the value of the physical quantity measured by the first sensor element is equal to that of the physical quantity measured by the second sensor element, the sensing circuit section preferably outputs a signal that has a non-zero value, thereby determining whether a line to propagate an output signal of the sensing circuit section is disconnected or not.

A vehicle according to a preferred embodiment of the present invention preferably includes the physical quantity sensing device according to any of the preferred embodiments of the present invention described above, and an engine that is operatively connected to the physical quantity sensing device such that an operation of the engine is controlled according to the physical quantity sensed by the physical quantity sensing device.

In one preferred embodiment of the present invention, the physical quantity sensed by the physical quantity sensing device is preferably a quantity depending on a force that has been applied by an operator on handlebars of the vehicle.

A zero point adjusting method according to a preferred embodiment of the present invention is a method for adjusting a zero point of the bridge circuit in the physical quantity sensing device according to one of the preferred embodiments of the present inventions described above. The method preferably includes the steps of a) minimizing the amplitude of a differential voltage between the first and second output points by adjusting one of the two balancing variable resistors with the physical quantity to be sensed by the first and second sensor elements decreased to zero, and b) minimizing the amplitude of the differential voltage between the first and second output points by adjusting the other balancing variable resistor with zero physical quantity applied to the first and second sensor elements.

In one preferred embodiment of the present invention, the method preferably includes the step of reducing the differential voltage to a local minimum value by repeatedly performing the steps a) and b).

According to various preferred embodiments of the present invention described above, two sensor elements are arranged in series in one of the two current paths of a bridge circuit, and the amount of exciting current flowing through the sensor elements can be increased, thereby minimizing the unwanted effects caused by a difference in characteristic between the sensor elements. In addition, according to preferred embodiments of the present invention, complete balancing is achieved at the zero point. Thus, compared to a conventional example in which a parallel bridge circuit is adopted, the difference that could arise between the output characteristics of the two sensor elements can be reduced significantly, too.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1C:
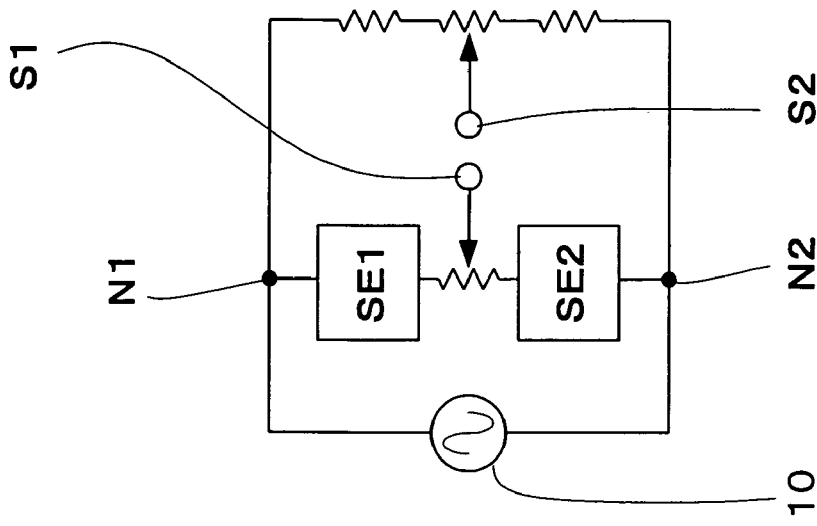
FIG. 1C shows a bridge circuit according to another preferred embodiment of the present invention having two sensor elements that are connected together in series and in which variable resistors are provided for two output points thereof.
Figure 1B:
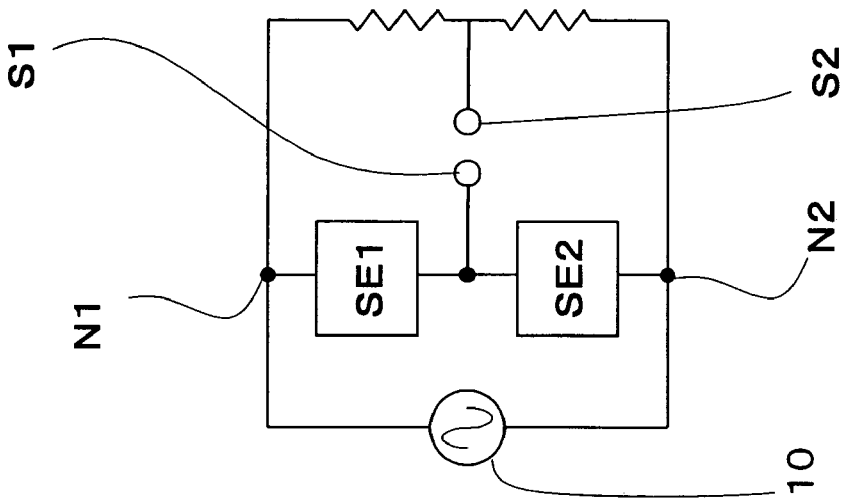
FIG. 1B shows a bridge circuit according to a preferred embodiment of the present invention having two sensor elements that are connected together in series.
Figure 1A:
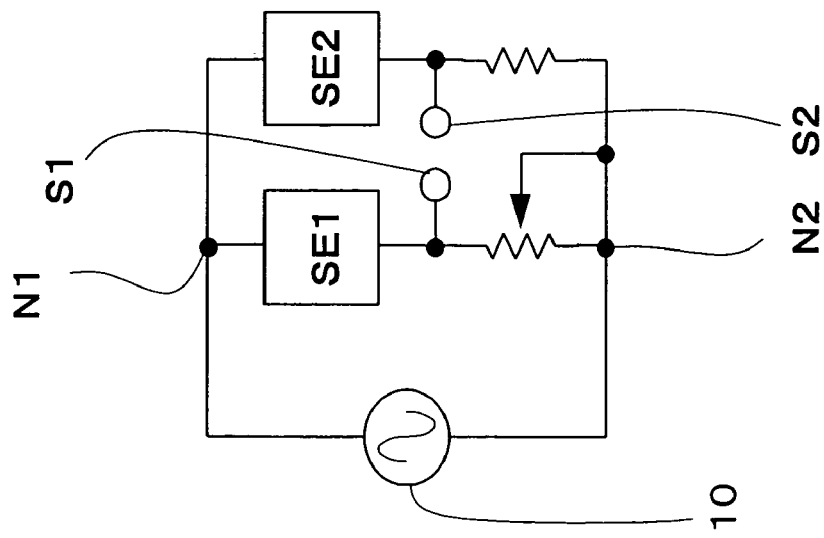
FIG. 1A shows a conventional bridge circuit having two sensor elements that are connected together in parallel.

A physical quantity sensing device according to a preferred embodiment of the present invention preferably includes a bridge circuit in which physical quantity sensor elements are connected in series together. As shown in FIG. 1B, this bridge circuit preferably has first and second input points N1 and N2, to which an AC voltage is applied, and first and second output points S1 and S2, which are connected to a differential amplifier. The AC voltage is preferably applied to the first and second input points N1 and N2 from an AC voltage generator 10. The output of the differential amplifier (not shown in FIG. 1B) that is connected to the first and second output points S1 and S2 will preferably be supplied as a signal voltage from a sensing circuit section (not shown, either).

The bridge circuit shown in FIG. 1B preferably includes a first bridge arm for electrically connecting the first input point N1 to the first output point S1, a second bridge arm for electrically connecting the first output point S1 to the second input point N2, a third bridge arm for electrically connecting the first input point N1 to the second output point S2, and a fourth bridge arm for electrically connecting the second output point S2 to the second input point N2.

The first bridge arm preferably includes a first sensor element SE1, the impedance of which changes with a physical quantity to be measured, and the second bridge arm preferably includes a second sensor element SE2, the impedance of which also changes with the physical quantity to be measured. In the bridge circuit shown in FIG. 1B, the two sensor elements SE1 and SE2 are connected in series together in this manner. That is why such a bridge circuit may be called a "serial bridge circuit" as opposed to the conventional "parallel bridge circuit".

According to a preferred embodiment of the present invention, the total impedance (i.e., fixed resistance value) of the first and second bridge arms, in which the first and second sensor elements SE1 and SE2 are connected in series together, is preferably smaller than that of the third and fourth bridge arms. Accordingly, when alternating current is supplied between the first and second input-points N1 and N2, the amount of the current flowing through the first and second bridge arms becomes larger than that of the current flowing through the third and fourth bridge arms. As a result, the amount of current flowing through the two serially connected sensor elements SE1 and SE2 can be much greater than that of current flowing through the conventional parallel connection of sensor elements. Consequently, much less detrimental effects are caused by the difference in characteristic between the sensor elements SE1 and SE2. More specifically, if the total impedance of the first and second bridge arms is one-ninth of that of the third and fourth bridge arms, then approximately 90% of the alternating current supplied from the AC voltage generator 10 to the bridge circuit section 20 will flow through the first and second bridge arms.

The total impedance of the first and second bridge arms is preferably at most about 90%, more preferably about 50% or less, and most preferably about 20% or less, of that of the third and fourth bridge arms.

Preferred Embodiment 1

Hereinafter, a magnetostrictive load sensing device will be described as a physical quantity sensing device according to a specific preferred embodiment of the present invention.

Figure 2:
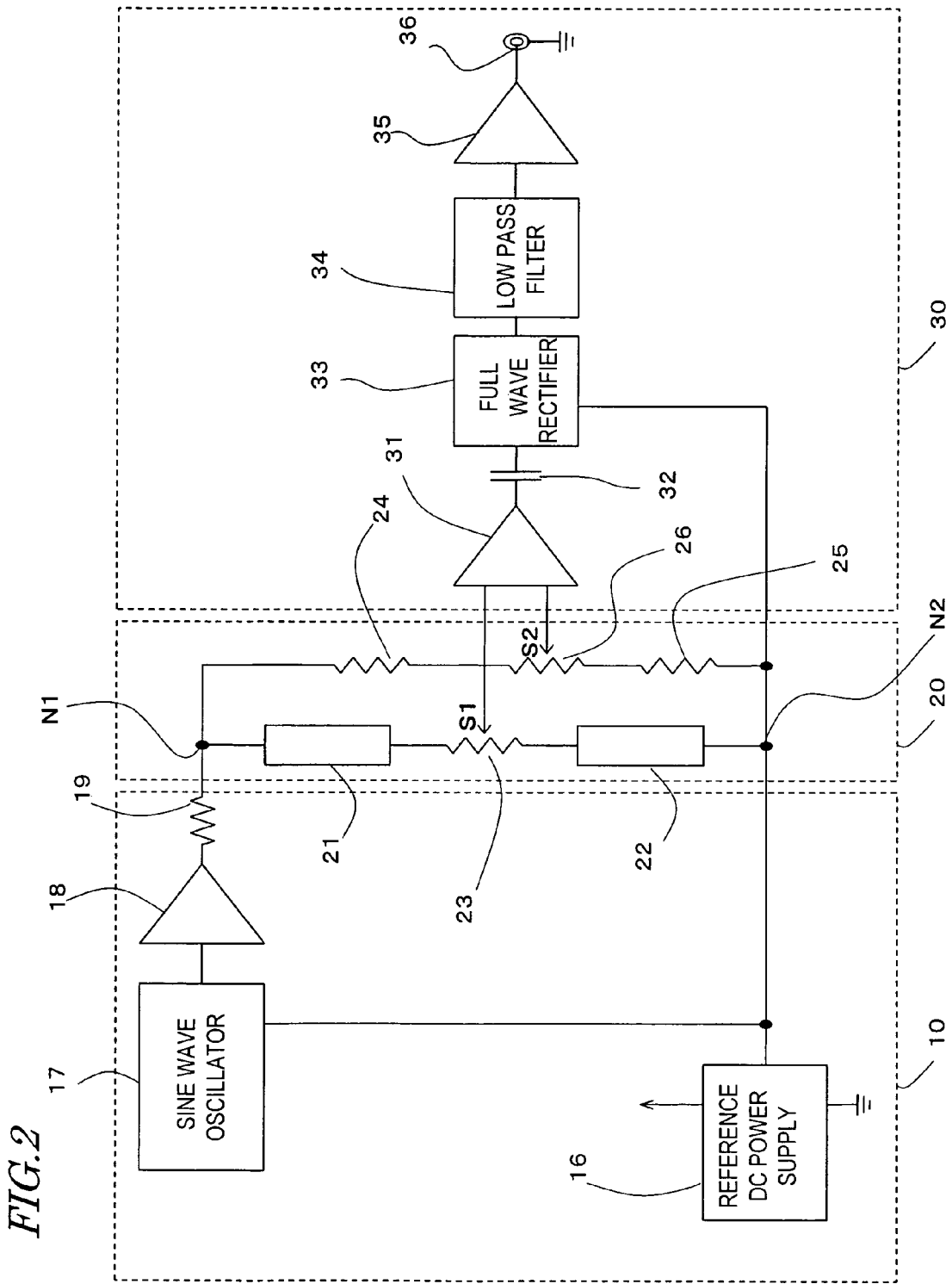
FIG. 2 is a circuit diagram showing a circuit configuration for a physical quantity sensing device according to a first specific preferred embodiment of the present invention.

FIG. 2 shows a circuit configuration for the main circuit sections of a load sensing device according to this preferred embodiment. This load sensing device preferably includes an AC voltage generating section 10, a bridge circuit section 20 and a sensing circuit section 30.

The AC voltage generating section 10 preferably includes a reference DC power supply 16, a sine wave oscillator 17 for producing a sine wave that oscillates with respect to a reference voltage, a buffer amplifier 18 with a high input impedance, and a current limiting fixed resistor 19 for adjusting the amount of current to be supplied to the bridge circuit section 20.

The bridge circuit section 20 preferably includes two magnetostrictive sensor elements 21 and 22, which are connected in series together with a balancing variable resistor 23 interposed between them, and two bridge fixed resistors 24 and 25, which are also connected in series together with a balancing variable resistor 26 interposed between them. This bridge circuit section 20 has basically the same configuration as the bridge circuit shown in FIG. 1C.

The sensing circuit section 30 preferably has an AC differential amplifier 31 for amplifying the differential voltage of the bridge circuit section 20, a DC blocking capacitor 32 for removing the DC components from the output signal of the differential amplifier 31, a full wave rectifier 33 for rectifying the remaining AC signal that has passed through the capacitor 32, a low pass filter 34 for smoothing the output voltage of the full wave rectifier 33, a DC amplifier 35 with a gain controlling variable resistor, and a signal voltage output terminal 36.

Next, the configuration of the bridge circuit section 20 will be described in further detail with reference to FIG. 3.

Figure 3:
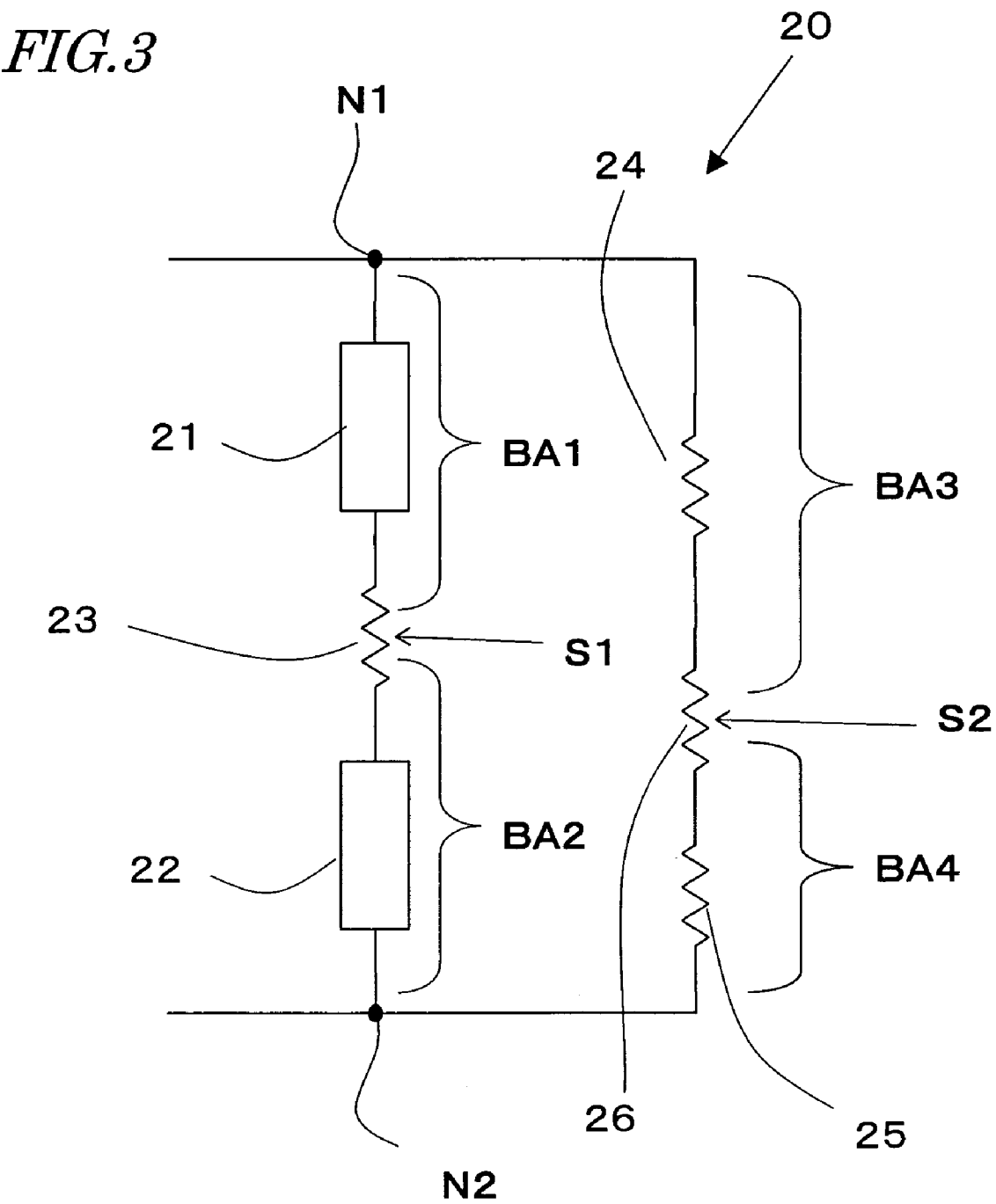
FIG. 3 is a circuit diagram showing a detailed configuration for the bridge circuit section 20 shown in FIG. 2.

As shown in FIG. 3, in the bridge circuit section 20 of this preferred embodiment, the first bridge arm BA1 preferably includes a magnetostrictive sensor element 21 and the second bridge arm BA2 preferably includes a magnetostrictive sensor element 22.

Each of the magnetostrictive sensor elements 21 and 22 preferably includes a magnetostrictive member made of a magnetostrictive material and a coil surrounding the magnetostrictive member. The coil of the magnetostrictive sensor element 21 preferably electrically connects the first input point N1 and the first output point S1 together. On the other hand, the coil of the magnetostrictive sensor element 22 preferably electrically connects the first output point Si and the second input point N2 together.

Figure 4A:
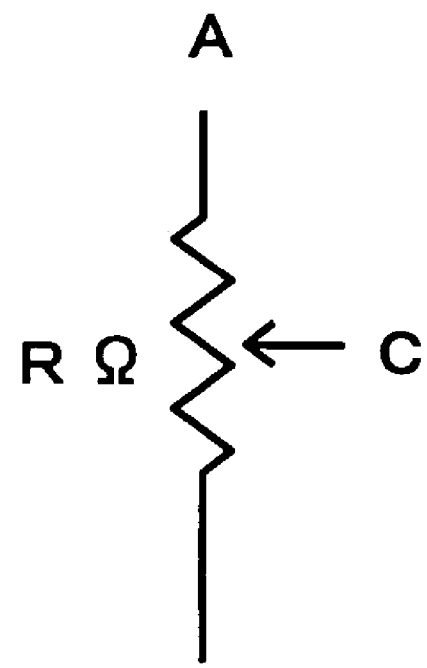
FIG. 4A shows a variable resistor.
Figure 4B:
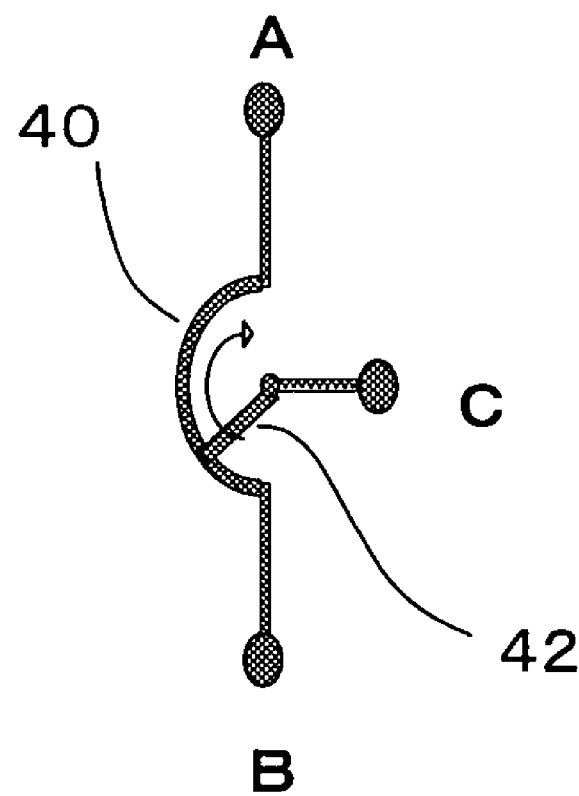
FIG. 4B shows a specific configuration for the variable resistor shown in FIG. 4A.

The connection node (i.e., the first output point S1) between the first and second bridge arms BA1 and BA2 is present in the balancing variable resistor 23. The balancing variable resistor 23 for use in this preferred embodiment preferably has a configuration as shown in FIGS. 4A and 4B. A resistive element 40 provided between terminals A and B preferably has a fixed resistance value R. However, by shifting the connection point (or contact point) between a contact 42 connected to a terminal C and the resistive element 40, the value of the resistance between the terminals A and C can be varied. Specifically, if the value of the resistance between the terminals A and C is increased, then that of the resistance between the terminals B and C decreases. At the location of the connection point between the contact 42 and the resistive element 40, the resistive element 40 can be divided into two resistive portions that are connected in series together. Supposing those two resistive portions have resistance values R1 and R2, R=R1+R2 is satisfied.

Referring back to FIG. 3, the impedance of the first bridge arm BA1 is represented as the sum of the impedance of the magnetostrictive sensor element 21 and the resistance R1 of one resistive portion in the balancing variable resistor 23 (if the wiring resistance is neglected; the same statement will apply to the following description, too). On the other hand, the impedance of the second bridge arm BA2 is represented as the sum of the impedance of the magnetostrictive sensor element 22 and the resistance R2 of the other resistive portion in the balancing variable resistor 23. Accordingly, the overall impedance of the first and second bridge arms BA1 and BA2 is represented as the sum of the total impedance of the magnetostrictive sensor elements 21 and 22 and the resistance value R of the balancing variable resistor 23. The resistance value R may be approximately equal to the difference in impedance between the magnetostrictive sensor elements 21 and 22, and can be sufficiently smaller than the impedance of the magnetostrictive sensor element 21 or 22. The impedances of the magnetostrictive sensor elements 21 and 22 for use in this preferred embodiment preferably fall within the range of about 50 Ω to about 100 Ω, for example. Meanwhile, the difference in impedance between these two magnetostrictive sensor elements 21 and 22 may be about 5 Ω to about 10 Ω, for example. Thus, the resistance value R may also be about 5 Ω to about 10 Ω, for example.

On the other hand, the third bridge arm BA3 in the bridge circuit section 20 preferably includes a fixed resistor 24 and the fourth bridge arm BA4 preferably includes a fixed resistor 25. And the connection node (i.e., the second output point S2) between the third and fourth bridge arms BA3 and BA4 is present in a balancing variable resistor 26. The structure of the balancing variable resistor 26 is the same as that of the balancing variable resistor 23.

In this preferred embodiment, the terminal C (see FIGS. 4A and 4B) in the balancing variable resistors 23 and 26 is preferably connected to the sensing circuit section 30 shown in FIG. 2 as described above. Accordingly, if the input impedance of the AC differential amplifier 31 is high, then a configuration in which no current flows between the output points of the bridge circuit section 20 and the signal input section of the sensing circuit section 30 is realized. The effects achieved by such a configuration will be described later.

Magnetostrictive Sensor Elements

Next, an exemplary arrangement of the magnetostrictive sensor elements 21 and 22 for use in a load sensing device according to this preferred embodiment will be described with reference to FIGS. 5 and 6. The load sensing device of this preferred embodiment may be used in various types of machines that need to measure the load placed thereon. In the following example, the load sensing device is attached to the steering shaft of a vehicle to detect torque.

Figure 5:
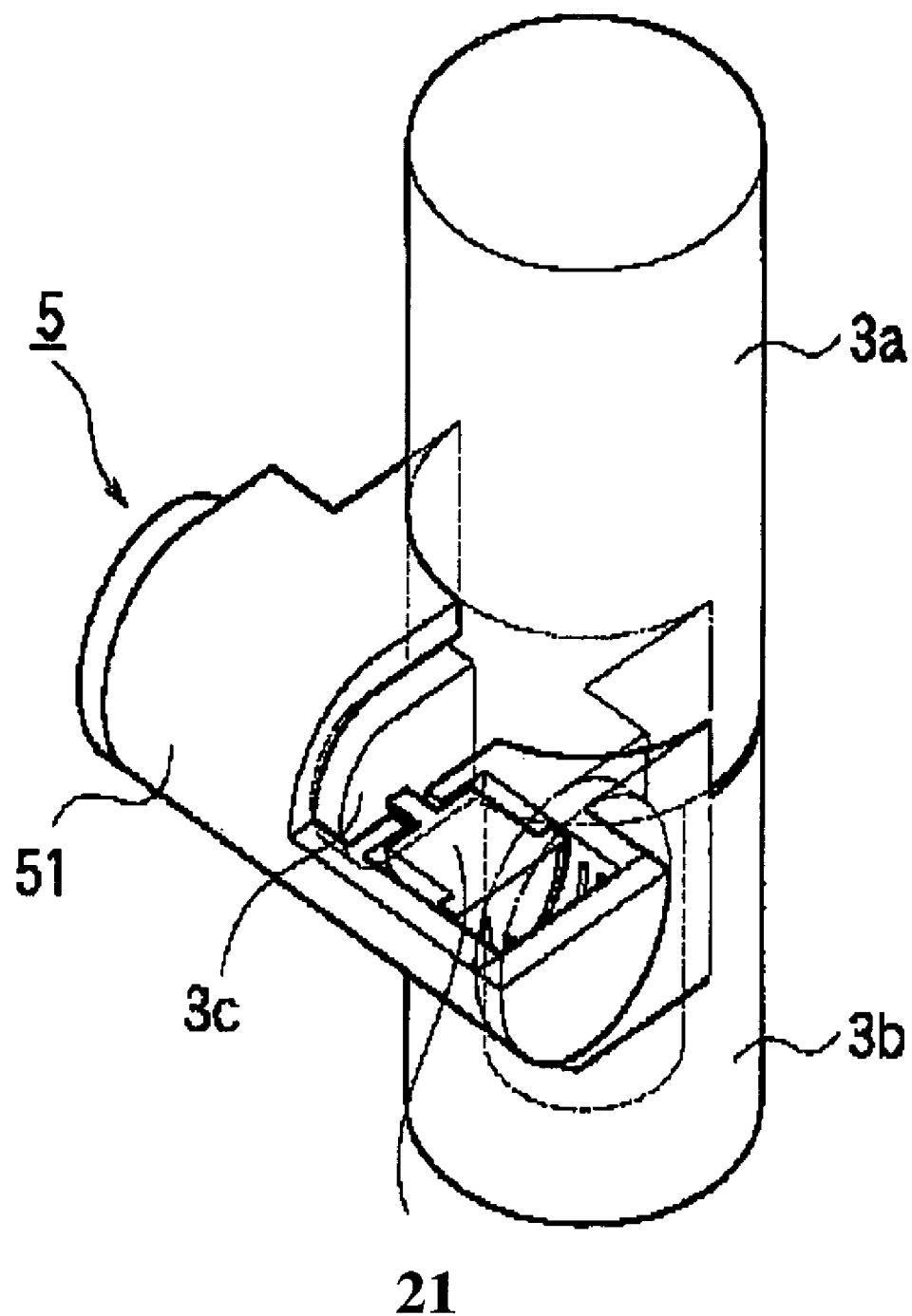
FIG. 5 is a perspective view illustrating a load sensor unit attached to a steering shaft.

FIG. 5 is a perspective view illustrating a load sensor unit 5 attached to a steering shaft. FIG. 6 is a cross-sectional view of the load sensor unit 5 as viewed on a plane that crosses the steering shaft at right angles. The load sensor unit 5 shown in FIG. 5 is preferably provided where an upper steering shaft 3a and a lower steering shaft 3b are joined together. The lower steering shaft 3b preferably has a sensor storage portion 51 at the upper end thereof, where the lower and upper steering shafts 3b and 3a are joined together. A pressing portion 3c, protruding from the outer periphery of a lower end portion of the upper steering shaft 3a, preferably sticks out into this sensor storage portion 51.

The sensor storage portion 51 is preferably horizontally split into two portions by the pressing portion 3c. The magnetostrictive sensor element 21 is preferably stored in the right-hand-side portion, while the magnetostrictive sensor element 22 is preferably stored in the left-hand-side portion.

The magnetostrictive sensor element 21 preferably has its bottom pressed by a spring 53A, which is provided between the bottom of the sensor element 21 and one of the sidewalls of the sensor storage portion 51, toward the pressing portion 3c. As a result, a pressed portion 55A, which protrudes from the opposite side of the magnetostrictive sensor element 21 (as opposed to the bottom), contacts with, and is pressed by, the pressing portion 3c.

Likewise, the magnetostrictive sensor element 22 also preferably has its bottom pressed by a spring 53B, which is provided between the bottom of the sensor element 22 and the other sidewall of the sensor storage portion 51, toward the pressing portion 3c. As a result, another pressed portion 55B, which protrudes from the opposite side of the magnetostrictive sensor element 22 (as opposed to the bottom), contacts with, and is pressed by, the pressing portion 3c.

Each of the magnetostrictive sensor elements 21 and 22 preferably includes a magnetic coil, which senses a magnetic variation by utilizing inverse magnetostriction effect and which makes up a magnetostrictive sensor along with its associated pressed portion 55A or 55B. Specifically, when the pressed portion 55A or 55B is pressed and strained by the pressing portion 3c, some magnetic variation (e.g., variation in permeability or magnetizing property) is produced in the pressed portion 55A or 55B and can be sensed as a variation in the impedance of the magnetic coil of the magnetostrictive sensor element 21 or 22.

In detecting the torque of the steering shaft by using this load sensor unit 5, if the handlebars are turned to the left, for example, then the upper steering shaft 3a coupled to the handlebars rotates in the direction pointed by the arrow 301. As the upper steering shaft 3a rotates in such a direction, the pressing portion 3c thereof also rotates along with the upper steering shaft 3a in the direction of the arrow 302. And by utilizing the rotational force of this upper steering shaft 3a, the pressed portion 55A and the magnetostrictive sensor element 21 are driven in the direction of the arrow 303 against the spring 53A.

When pressed by the pressing portion 3c as the upper steering shaft 3a rotates, the pressed portion 55A is strained with the rotational force of the upper steering shaft 3a. As a result, a magnetic variation is produced in the pressed portion 55A so as to represent that strain. Eventually, this magnetic variation is sensed as the rotation torque of the upper steering shaft 3a by the magnetic coil of the magnetostrictive sensor element 21.

On the other hand, when the handlebars are turned to the right (i.e., in the opposite direction), the magnetostrictive sensor element 22, pressed portion 55B and spring 53B perform substantially the same functions as their counterparts 21, 55A and 53A except that their rotational and pressing directions are opposite. Thus, the description thereof will be omitted herein.

Suppose a certain load of F newtons (N) was applied in advance to the spring 53A while this load sensor unit 50 was assembled. In that case, unless the load applied by the pressing portion 3c on the pressed portion 55A and magnetostrictive sensor element 21 exceeds F newtons, the pressed portion 55A and the magnetostrictive sensor element 21 do not move. However, once the load has exceeded F newtons, the pressed portion 55A and the magnetostrictive sensor element 21 start moving to the right. Thus, an overload preventing mechanism, in which a load exceeding F newtons is never applied to the pressed portion 55A and the magnetostrictive sensor element 21, is realized.

The method of applying a load to the magnetostrictive sensor elements of a load sensing device does not have to be that described above but may also be any of various other methods. However, in a preferred embodiment of the present invention, a load is preferably applied to only one of the two magnetostrictive sensor elements and the other magnetostrictive element, to which no load is applied, is used as a reference for measurement. Thus, in the load sensing device of this preferred embodiment, the load to be measured needs to be placed on one of the two magnetostrictive sensor elements. This principle applies to every imaginable situation where a predetermined physical quantity is measured with a physical quantity sensing device according to any preferred embodiment of the present invention.

Figure 6:
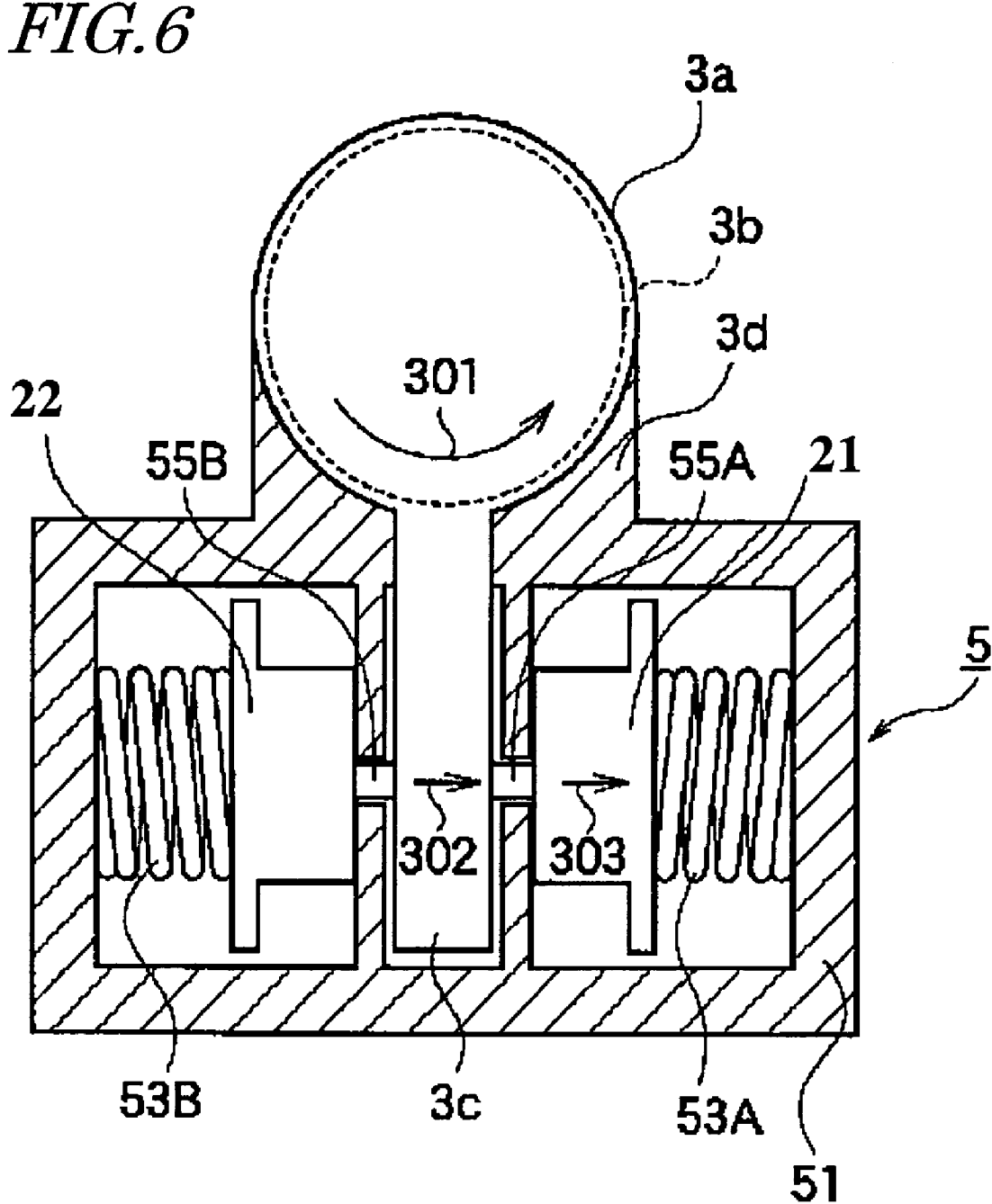
FIG. 6 is a cross-sectional view showing the configuration of the load sensor unit shown in FIG. 5.

FIGS. 5 and 6 do not illustrate any electronic circuit board on which amplifiers, resistors and other circuit components are integrated together. However, each of these electronic circuit boards may be either arranged in the vicinity of its associated magnetostrictive sensor element or combined with another control circuit section away from the magnetostrictive sensor element.

Load Sensing Operation

Hereinafter, it will be described more fully with reference to FIG. 2 how the load sensing device of this preferred embodiment performs its measuring operation.

First, the reference DC power supply 16 preferably outputs a reference DC voltage of about 2.5 V after receiving a supply voltage of about 5 V (not shown), for example. This reference DC voltage is preferably input to the sine wave oscillator 17. In response, the sine wave oscillator 17 preferably outputs a sine wave oscillation signal that oscillates with respect to this reference DC voltage. The sine wave oscillation signal may have a frequency of about 1 kHz and an amplitude Vpp (peak to peak) of about 2 V, for example.

Then, this oscillation signal is preferably supplied to the bridge circuit section 20 by way of the high-impedance buffer amplifier 18 and current limiting fixed resistor 19.

When a load is placed on one of the magnetostrictive sensor elements 21 and 22, the initial permeability of the magnetostrictive material changes due to the magnetostriction effect in the magnetostrictive sensor element 21 or 22 that has just received the load. As a result, the impedance of that magnetostrictive sensor element 21 or 22 changes from its initial value and the impedance balance is disturbed between the first and second bridge arms.

Once the impedance balance has been lost in this manner, a differential voltage is generated between the first and second output points S1 and S2 of the bridge circuit section 20. Thereafter, this differential voltage is amplified by the AC differential amplifier 31 of the sensing circuit section 30. The AC components of the output signal of the AC differential amplifier 31 pass through the DC blocking capacitor 32 and then enter the full wave rectifier 33.

The full wave rectifier 33 includes rectifying diodes but cannot perform a rectifying operation at less than the forward voltage. That is to say, the rectifier 33 has a dead band. To avoid such an unwanted situation and make the full wave rectifier 33 perform an appropriate rectifying operation, the AC differential amplifier 31 preferably has as high a gain as possible. In this preferred embodiment, the gain of the AC differential amplifier 31 is preferably controlled to its maximum level such that the output of the AC differential amplifier 31 will not be saturated even if a load of absolute maximum rating is placed on one of the two magnetostrictive sensor elements 21 and 22.

Also, in this preferred embodiment, in order to increase the sensitivity of the full wave rectifier 33, the amplitude of the signal is doubled after the full wave rectification has been done. The amplified signal is then input to the low pass filter 34. To remove AC components with the same frequency as that of the exciting current (i.e., the oscillation frequency) sufficiently, the cutoff frequency of the low pass filter 34 is preferably about 1/10 or less of the oscillation frequency.

The output of the low pass filter 34 is preferably amplified by the DC amplifier 35 and then output through the signal voltage output terminal 36. The magnitude of the signal voltage at the signal voltage output terminal 36 preferably corresponds to that of the load that has been placed on one of the magnetostrictive sensor elements 21 and 22.

Initial Adjustment

To measure the load with high accuracy, an initial adjustment needs to be carried out. In this preferred embodiment, two types of initial adjustments are performed. One of the two types is a "zero point adjustment" in which the signal voltage output through the signal voltage output terminal 36 is set equal to zero with no load applied to the magnetostrictive sensor elements 21 and 22. The other type of initial adjustment is a "sensitivity adjustment" in which the signal voltage output through the signal voltage output terminal 36 is set to a predetermined value with a load of absolute maximum rating applied to the one of the magnetostrictive sensor elements 21 and 22.

In this preferred embodiment, while the AC output of the AC differential amplifier 31 is measured, the balancing variable resistors 23 and 26 are preferably adjusted so as to minimize the amplitude value of this AC output (which is the "zero point adjustment"). Next, with the DC output of the DC amplifier 35 measured, a load of about 400 newtons is preferably applied to one of the magnetostrictive sensor elements 21 and 22. The gain of the DC amplifier 35 is preferably controlled so as to set the output DC voltage of the DC amplifier 35 equal to about 3.5 V, for example, while this load is being applied (which is the "sensitivity adjustment").

It should be noted that the differential amplifier 31, functioning as a buffer amplifier, may have an output current of about 10 mA, for example. In this preferred embodiment, the serial bridge circuit is adopted instead of the conventional parallel bridge circuit. Thus, the amount of current flowing through the first and second bridge arms, including the magnetostrictive sensor elements 21 and 22, can be greater than that of current flowing through the third and fourth bridge arms. Accordingly, even if the two magnetostrictive sensor elements 21 and 22 have somewhat varied initial characteristics due to a difference in initial permeability, for example, a sufficiently large amount of current can still flow through the magnetostrictive sensor elements 21 and 22 and the difference in output characteristic between the magnetostrictive sensor elements 21 and 22 would not decrease the sensing accuracy.

It should be noted that to increase the sensitivity of the AC differential amplifier 31, it is important to expand the differential amplitude range of the signal that is going to enter the AC differential amplifier 31. To maximize the amplitude of the differential output voltage at the rated load, the impedance of the first bridge arm in the bridge circuit needs to be substantially equal to that of the second bridge arm. If the impedances are substantially matched between the first and second bridge arms, then the approximate center of the differential amplitude range can be brought close to the reference voltage. As a result, the gain of the AC differential amplifier 31 can be increased.

The magnetostrictive sensor elements 21 and 22 for use in this preferred embodiment have substantially equal impedances. Thus, compared to the conventional example that adopts the parallel bridge circuit, it is much easier to substantially match the impedances of the first and second bridge arms with each other. This is one of the advantages achieved by connecting the magnetostrictive sensor elements 21 and 22 in series together.

Also, if the impedance of the magnetostrictive sensor element 21 is substantially equal to that of the magnetostrictive sensor element 22, then the resistance variation range that the balancing variable resistor 23 needs to have can be much smaller than the impedances of the respective magnetostrictive sensor elements 21 and 22. This contributes to not only reducing the overall impedance of the first and second bridge arms but also minimizing the unwanted effects caused by the temperature characteristic of the balancing variable resistor 23. The resistance of the balancing variable resistor 23 usually has a relatively large degree of temperature dependence. For that reason, if the temperature of the balancing variable resistor 23 has varied after the zero point adjustment has been made, then the impedance balance is disturbed more easily. According to this preferred embodiment, however, the resistance value of the balancing variable resistor 23 can be sufficiently smaller than the impedances of the sensor elements. Consequently, the unwanted effects caused by the temperature characteristic of the resistor can be minimized.

Balancing

Hereinafter, a balancing method according to this preferred embodiment will be described. As used herein, the "balancing" means to reduce the output differential voltage of the bridge circuit section 20 (i.e., the voltage between the output points S1 and S2) to zero while no load is being applied to either of the two magnetostrictive sensor elements 21 and 22 (which state will be referred to herein as a "no-load state").

First, one of the balancing variable resistors 23 and 26 is preferably adjusted in the no-load state, thereby minimizing the output amplitude of the AC differential amplifier 31. Next, the other balancing variable resistor 23 or 26 is preferably adjusted still in the no-load state, thereby minimizing the output amplitude of the AC differential amplifier 31 again. If the output amplitude is reduced to a local minimum value by alternately making such an adjustment on the two balancing variable resistors 23 and 26, the residual voltage can be reduced to zero completely (which is called "complete balancing"), theoretically speaking.

However, if the residual voltage has not quite reached zero due to incomplete zero point adjustment, then the output signal of one of the magnetostrictive sensor elements 21 and 22 that has received a load will have a temporarily decreased level. As a result, differences will be produced between the output characteristics of the two magnetostrictive sensor elements. According to this preferred embodiment, however, such a phenomenon can be eliminated.

Figure 7:
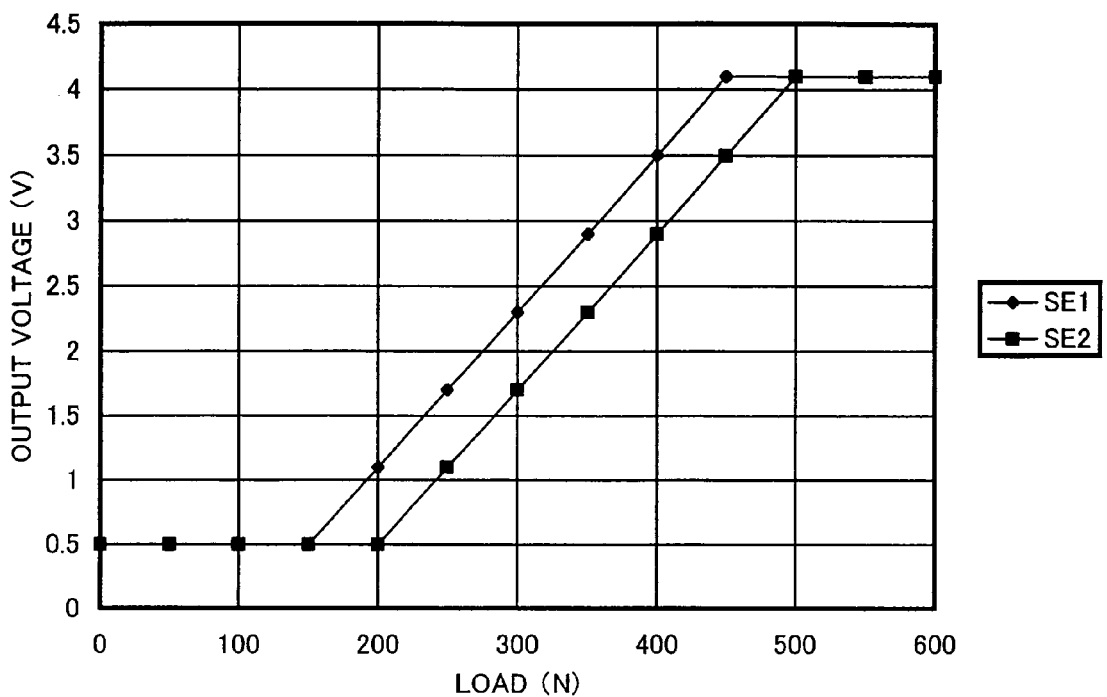
FIG. 7 is a graph showing how the outputs of two sensors change with the given load in a load sensing device of a comparative example in which balancing has been done incompletely on its bridge circuit section.
Figure 8:
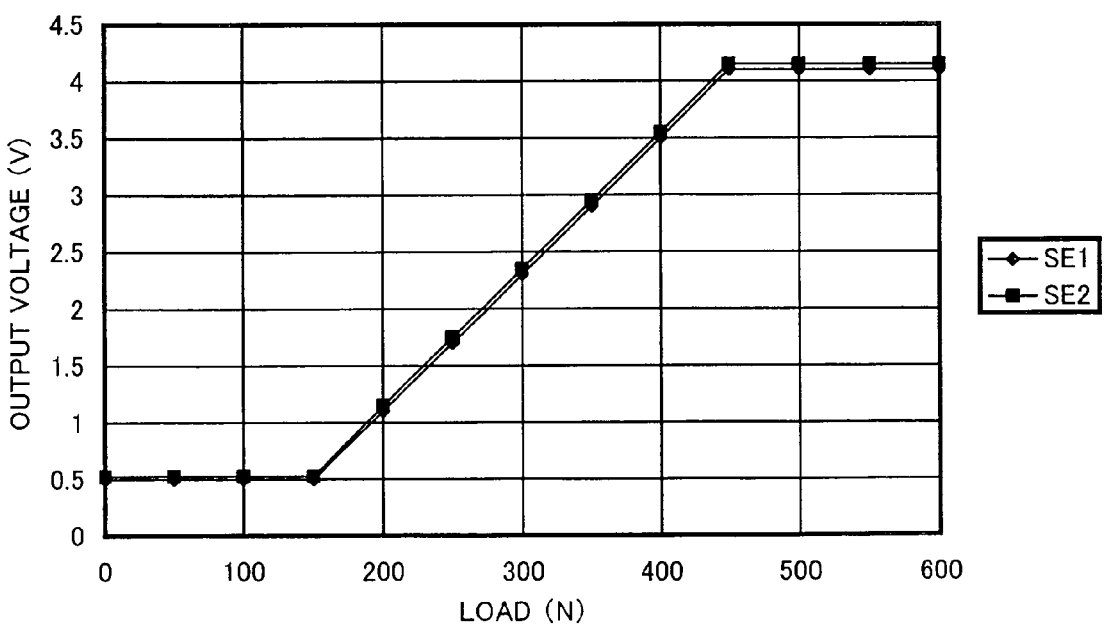
FIG. 8 is a graph showing how the outputs of two sensors change with the given load in a load sensing device according to a preferred embodiment of the present invention in which balancing has been done completely on its bridge circuit section.

FIG. 7 is a graph showing the output characteristics of the two magnetostrictive sensor elements on which balancing has been done incompletely with the conventional bridge circuit. On the other hand, FIG. 8 is a graph showing the output characteristics of the same two magnetostrictive sensor elements in the bridge circuit of this preferred embodiment on which complete balancing has been done. As can be seen from FIG. 7, if the balancing has been done incompletely, then there is a significant difference between the outputs of the two magnetostrictive sensor elements. Meanwhile, in this preferred embodiment in which the balancing has been done completely, there is almost no difference between the outputs of the two magnetostrictive sensor elements as can be seen from FIG. 8.

Thus, the circuit configuration shown in FIG. 2 realizes complete balancing and can reduce the residual voltage to absolutely zero. The zero residual voltage means that the output voltage level under no load also reaches zero.

It should be noted that in FIGS. 7 and 8, the output in a very small load area is not zero but about 0.5 V due to "disconnection detection". Hereinafter, it will be described how to carry out this "disconnection detection".

In the load sensing device of this preferred embodiment, if the residual voltage is reduced to zero through the complete balancing, then the signal voltage at the input section of the DC amplifier 35 will be 0 V while a zero load is being applied to the magnetostrictive sensor element.

When the load sensing device is used in a system for a vehicle, for example, the output signal may be supplied from the signal voltage output terminal 36 to an engine control unit by way of a harness. However, if some of the lines in this harness were disconnected, a 0 V voltage would always be supplied to the engine control unit, no matter whether or not a load is being applied to the load sensing device. In that case, it would be difficult to determine whether this is a no-load state or a disconnected state.

In view of this consideration, the DC amplifier 35 of this preferred embodiment is preferably designed so as to have a non-zero output voltage of about 0.5 V even if the input voltage thereof is 0 V. That is to say, while operating, the load sensing device of this preferred embodiment always outputs a signal with a non-zero value, no matter whether a load is being applied to the magnetostrictive sensor element or not. The non-zero value in the normal state is clearly different from the value in an abnormal (e.g., disconnected) state. Accordingly, if the engine control unit has received an output voltage lower than the reference voltage of about 0.5 V, for example, from the load sensing device, then the disconnection can be detected easily.

The present inventors confirmed via experiments how much the residual voltage was affected by the difference in balancing circuit. As a result, the present inventors discovered that the residual voltage level varied significantly in the incomplete balancing circuit but that the measuring dynamic range could be expanded effectively according to the data collected for the complete balancing circuit.

As described above, the zero point stability has an important effect on the horizontal imbalance of the sensor and the sensing accuracy of a very small load. That is why the zero point should be stabilized as much as possible.

The lines, resistors, amplifiers, capacitors and other circuit components, which together form the circuit shown in FIG. 2, are preferably integrated together on a single electronic circuit board. The electronic circuit board is preferably encapsulated with a molding resin compound after having been subjected to appropriate adjustments. If the surface of the electronic circuit board is covered with the resin in this manner, then the movable portions of the balancing variable resistors 23 and 26 will not move anymore. However, the contact 42 (see FIGS. 4A and 4B) of these balancing variable resistors 23 and 26 is not completely fixed. Accordingly, the contact portion between the resistive element 40 and the contact 42 shown in FIGS. 4A and 4B has an inconsistent resistance value (contact resistance value), which easily changes with time.

A conventional parallel bridge circuit with a variable resistor is designed such that current flows through its contact. In such a circuit, the variation in contact resistance value changes the value of the resistance between the terminals A and B shown in FIG. 4B, thus changing the equilibrium point of the bridge circuit.

In the bridge circuit section 20 of this preferred embodiment, however, the AC differential amplifier 31 preferably has such high input impedance that almost no current flows through the contacts of the balancing variable resistors 23 and 26. Accordingly, even if the value of the contact resistance in the contacts of the balancing variable resistors 23 and 26 has varied with time or for any other reason, that variation does not affect the sensed voltage at all and the reliability of measurement can be increased.

In the serial bridge circuit for use in this preferred embodiment of the present invention, balancing can still be performed even if a variable resistor is inserted into at least one (preferably both) of the bridge arms. In that case, however, current will flow through the contact of each variable resistor and the stability might decrease due to a variation in contact resistance. Even so, the decrease in zero point stability is still avoidable by using variable resistors with much more consistent contact resistance.

Preferred Embodiment 2

Hereinafter, a water vehicle including the load sensing device of the first specific preferred embodiment of the present invention will be described. In the following description, a watercraft will be described as a water vehicle according to a second specific preferred embodiment of the present invention. The watercraft is preferably propelled by jetting out water, which has been pressurized by an engine-driven jet propulsion machine, through a nozzle and by taking advantage of the reaction produced by the water jet. When used in such a vehicle, a physical quantity sensing device such as a load sensing device needs to guarantee sufficient durability and long-term reliability because the vehicle is supposed to be used on the water, which is a very severe environment for any electromechanical device to endure. Thus, by using the physical quantity sensing device of the preferred embodiment of the present invention, many beneficial effects can be achieved.

Figure 9:
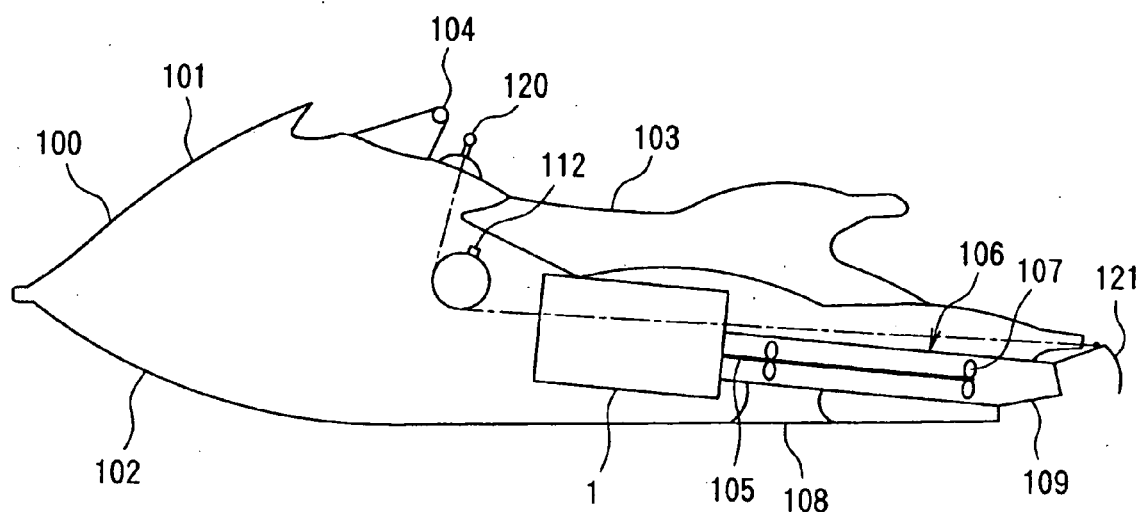
FIG. 9 schematically illustrates a configuration for a watercraft 100 as an exemplary vehicle including a physical quantity sensing device according to a preferred embodiment of the present invention.

FIG. 9 illustrates a schematic configuration for a watercraft 100 according to this preferred embodiment. The hull 100 of the watercraft preferably includes a lower hull member 101 and an upper deck member 102. An operator's seat 103 is preferably provided on the deck member 102. In front of this seat 103, steering handlebars 104 are provided.

In the hull, an engine 1 is preferably provided as a drive motor and the output shaft 105 of the engine 1 is connected to the impeller 107 of a jet propulsion machine 106. Accordingly, when the impeller 107 of the jet propulsion machine 106 is driven by the engine 1, water is sucked through a water sucking hole 108 on the bottom of the boat and then pressurized and accelerated by the jet propulsion machine 106. Then, the pressurized water is jetted backward through a nozzle 109, thereby advancing the boat due to its reaction. Also, if the handlebars 104 are turned, then a steering mechanism called a "deflector" swings behind the nozzle 109, thereby steering the boat either to the right or to the left. That is to say, by turning the handlebars 104, the direction of the water jet changes and the boat can be steered in an arbitrary direction. To reverse the boat, a reverse lever 120 is handled, thereby moving a reverse gate 121 up or down behind the nozzle 109 and jetting the water forward through the nozzle 109. A reverse switch 112 is used to sense the backward movement of the boat through the handling of the reverse lever 120.

Figure 10:
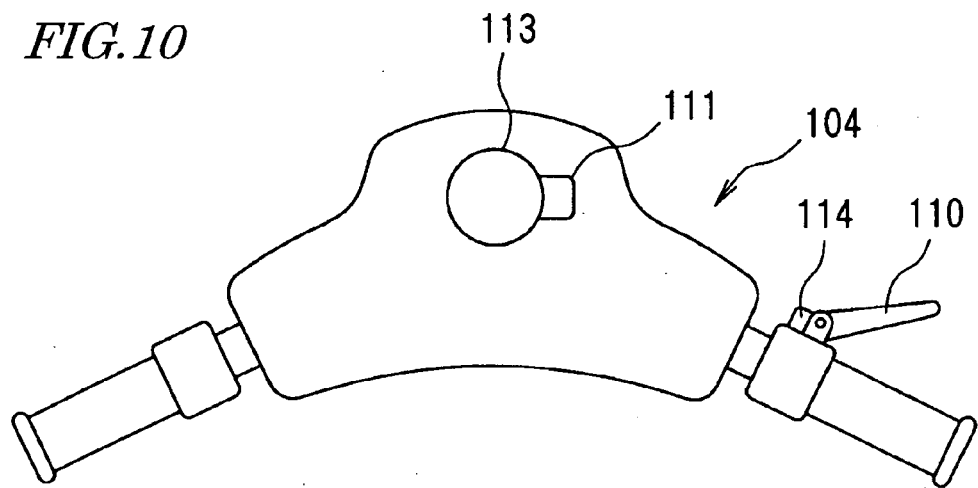
FIG. 10 illustrates the configuration of the handlebars 104 shown in FIG. 9.

FIG. 10 illustrates a configuration for the handlebars 104. The handlebars 104 can be turned either to the right or to the left around the steering shaft 113. A throttle lever 110 to be handled by the operator to accelerate or decelerate the boat is preferably provided near the right grip of the handlebars 104. While not gripped, this throttle lever 110 is not in contact with the right grip. In accelerating this boat, the operator grips the throttle lever 110 toward the grip end. And when released, the throttle lever 110 returns to its rest position to decelerate the boat.

A steering torque sensor 111 for sensing the steering force (more specifically, steering torque) on the handlebars 104 is preferably provided on the steering shaft 113. This steering torque sensor 111 preferably has the same configuration as the magnetostrictive load sensing device of the first preferred embodiment described above. When the handlebars 104 are turned to a predetermined degree, the shaft of the handlebars 104 is restricted and the handlebars 104 will not move anymore. The steering torque sensor 111 further functions as a load cell for sensing the steering torque on the handlebars 104 while steering force is being applied to the handlebars 104. It should be noted that the configuration of the steering torque sensor 111 is not limited to the specific configuration of the load sensor unit shown in FIGS. 5 and 6. Rather, the magnetostrictive sensor elements may be arranged and mechanically connected in various other ways. The throttle lever 110 is provided with a throttle opening sensor 114 for sensing to what degree the throttle lever 110 has been pressed by the operator (i.e., the throttle opening).

Figure 11:
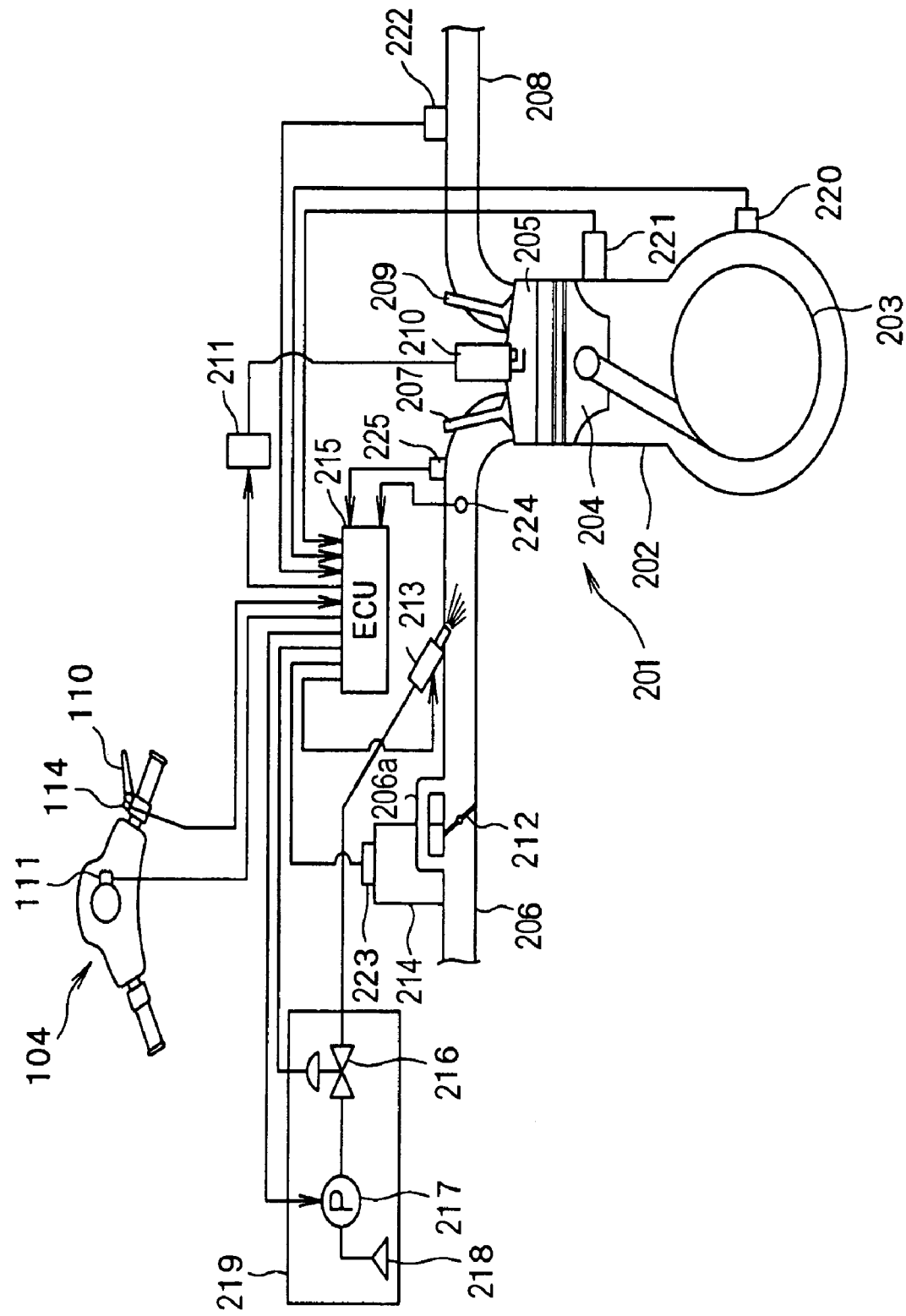
FIG. 11 schematically illustrates the engine and controller of the watercraft 100.

FIG. 11 schematically shows the engine and controller of the watercraft 100. The engine 201 of this preferred embodiment is preferably a stroke engine 201 with a relatively small displacement and preferably includes a cylinder body 202, a crank shaft 203, a piston 204, a combustion chamber 205, an intake pipe 206, an intake valve 207, an exhaust pipe 208, an exhaust valve 209, an ignition plug 210 and an ignition coil 211. Also, in the intake pipe 206, a throttle valve 212 is preferably arranged so as to open and close itself according to the opening of the throttle lever 110. And in a portion of the intake pipe 206, an injector 213 is preferably provided as a fuel injector downstream of the throttle valve 212. This injector 213 is preferably connected to a filter 218, a fuel pump 217 and a pressure control valve 216, which are provided in a fuel tank 219.

In the vicinity of the throttle valve 212 of the intake pipe 206, a bypass pipe 206a is preferably arranged so as to bypass the fuel beside the throttle valve 212. And this bypass pipe 206a is preferably provided with a bypass valve 214 for adjusting the opening of the bypass pipe 206a (as a means for controlling the engine output during deceleration). Just like an idle valve, the bypass valve 214 preferably adjusts the intake air flow toward the engine 201 independently of the opening of the throttle valve 212, thereby controlling the output of the engine (i.e., the engine torque in this case). It should be noted that the opening of the bypass pipe 206a (i.e., the engine torque) is controllable by adjusting the amount of current supplied to an actuator 223 for driving the bypass valve 214 or the duty ratio thereof as in an electromagnetic duty valve, for example.

The operation state of the engine 201 and the driving state of the actuator 223 for the bypass valve 214 are preferably controlled by an engine control unit 215, which preferably includes a computer such as a microcomputer. As control inputs to the engine control unit 215 (i.e., means for detecting the operation state of the engine 201), provided are a crank angle sensor 220 for detecting the angle of rotation (i.e., the phase) of the crank shaft 203 or the rotational velocity of the crank shaft 203 itself, a cooling water temperature sensor 221 for sensing either the temperature of the cylinder body 202 or that of the cooling water (i.e., the temperature of the engine body), an exhaust air-fuel ratio sensor 222 for sensing the air-fuel ratio in the exhaust pipe 208, an intake pressure sensor 224 for sensing the intake pressure in the intake pipe 206, and an intake temperature sensor 225 for sensing the temperature in the intake pipe 206. (i.e., the intake temperature).

Normally, the output signal of the throttle opening sensor 114 provided for the throttle lever 110 is used to control the engine torque. In an off-throttle mode, however, the output signal of the steering torque sensor (i.e., the magnetostrictive load sensor) 111 provided for the steering handlebars 104 may also be used to control the engine torque. The engine control unit 215 preferably receives the sensing signals of these sensors, thereby outputting control signals to the fuel pump 217, pressure control valve 216, injector 213, ignition coil 211 and actuator 223.

According to this preferred embodiment, the steering torque can be detected with a load sensing device on which complete balancing has been done. That is why rather high measuring accuracy and improved reliability are achieved even if the given load is relatively small. In the preferred embodiment described above, the present invention is applied to a watercraft as an exemplary water vehicle. However, the present invention is in no way limited to that specific preferred embodiment.

In the preferred embodiments described above, magnetostrictive sensor elements are preferably used as exemplary sensor elements. However, the present invention is in no way limited to those specific preferred embodiments. Alternatively, sensor elements that sense a given load by utilizing a variation in electrostatic capacitance, a piezoelectric effect, or a variation in electrical resistance may also be used instead of the sensor elements that use the magnetic variation. Specifically, in such sensors utilizing a variation in electrostatic capacitance, the pressed portion is preferably an electrostatic capacitive electrode, and some element or device for sensing a variation in electrostatic capacitance preferably senses a variation in electrostatic capacitance as a variation at the pressed portion when the electrode is pressed with the rotational force of the steering shaft. On the other hand, in sensors utilizing a piezoelectric effect, the pressed portion is preferably a piezoelectric element, and some element or device for sensing a piezoelectric variation preferably senses an electrical variation of the piezoelectric element as a variation at the pressed portion when the piezoelectric element is pressed with the rotational force of the steering shaft. Furthermore, in sensors utilizing a variation in electrical resistance, the pressed portion is preferably a resistor and some element or device for sensing a resistance variation preferably senses an electrical resistance variation of the resistor as a variation at the pressed portion when the resistor is pressed with the rotational force of the steering shaft.

Nevertheless, the present invention achieves the most significant effects by using the magnetostrictive sensor elements among various other types of sensor elements. This is because when the magnetostrictive sensor elements are used, the variation in characteristics would be minimized if a large amount of current could be supplied to the sensor elements but such an amount of current cannot be supplied actually. Thus, the present invention achieves significant effects when a given load needs to be measured accurately by using magnetostrictive sensor elements with such a problem.

A physical quantity sensing device according to any of various preferred embodiments of the present invention described above can be used effectively to sense the load that has been placed on any of numerous types of vehicles to be used either on the ground or on the water. Thus, this sensing device has a high degree of industrial applicability.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2004-161672 filed on May 31, 2004; the entire contents of which are hereby incorporated by reference.

What is claimed is:

1. A physical quantity sensing device comprising:
   a bridge circuit including:
      first and second input points, to which an AC voltage is applied;
      first and second output points, which are connected to a differential amplifier;
      a first bridge arm arranged to electrically connect the first input point to the first output point;
      a second bridge arm arranged to electrically connect the first output point to the second input point;
      a third bridge arm arranged to electrically connect the first input point to the second output point; and
      a fourth bridge arm arranged to electrically connect the second output point to the second input point; wherein
      the first bridge arm includes a first sensor element, an impedance of which changes with a physical quantity to be measured, and the second bridge arm includes a second sensor element, an impedance of which changes with the physical quantity to be measured;
      a total impedance of the first and second bridge arms is smaller than that of the third and fourth bridge arms; and
      each of the first and second sensor elements is a magnetostrictive sensor element, an impedance of which changes according to a given load, and the physical quantity to be measured is a load that has been placed on one of the first and second sensor elements.

2. The physical quantity sensing device of claim 1, wherein the first sensor element is a first magnetostrictive sensor element including a first magnetostrictive member made of a magnetostrictive material and a first coil surrounding the first magnetostrictive member, the first coil electrically connecting the first input point and the first output point together, and the second sensor element is a second magnetostrictive sensor element including a second magnetostrictive member made of the magnetostrictive material and a second coil surrounding the second magnetostrictive member, the second coil electrically connecting the first output point and the second input point together.

3. The physical quantity sensing device of claim 1, wherein a total impedance of the first and second bridge arms is at most about 90% of that of the third and fourth bridge arms.

4. The physical quantity sensing device of claim 1, wherein at least one of the first and second bridge arms includes a balancing variable resistor.

5. The physical quantity sensing device of claim 1, wherein the bridge circuit further includes a balancing variable resistor, which is connected in series between the first and second sensor elements, and the first output point is connected to the balancing variable resistor.

6. The physical quantity sensing device of claim 5, wherein the bridge circuit further includes a second balancing variable resistor, which is connected in series between the third and fourth bridge arms, and the second output point is connected to the second balancing variable resistor.

7. The physical quantity sensing device of claim 6, wherein while the sensing device is performing a measuring operation, substantially no current flows between the first output point and the differential amplifier and between the second output point and the differential amplifier.

8. The physical quantity sensing device of claim 1, further comprising an AC voltage generator arranged generate the AC voltage applied to the first and second input points of the bridge circuit, and the AC voltage generator and the differential amplifier, which is connected to the first and second output points, are integrated together on a common electronic circuit board.

9. The physical quantity sensing device of claim 8, wherein the AC voltage generator includes an oscillator and an amplitude limiter arranged to limit the amplitude of an output signal of the oscillator.

10. The physical quantity sensing device of claim 1, further comprising a sensing circuit section that includes the differential amplifier, wherein even if the value of the physical quantity measured by the first sensor element is equal to that of the physical quantity measured by the second sensor element, the sensing circuit section outputs a signal that has a non-zero value, thereby determining whether a line to propagate an output signal of the sensing circuit section is disconnected or not.

11. A vehicle comprising:
    the physical quantity sensing device of claim 1; and
    an engine operatively connected to the physical quantity sensing device such that an operation of the engine is controlled according to the physical quantity sensed by the physical quantity sensing device.

12. The vehicle of claim 11, wherein the physical quantity sensed by the physical quantity sensing device is a quantity depending on a force that has been applied by an operator on handlebars of the vehicle.

13. The vehicle of claim 11, wherein the vehicle is a jet propelled boat.

14. The vehicle of claim 11, wherein the physical quantity sensing device includes a steering torque sensor.

15. A method for adjusting a zero point of a bridge circuit in a physical quantity sensing device including a bridge circuit having first and second input points, to which an AC voltage is applied, first and second output points, which are connected to a differential amplifier, a first bridge arm arranged to electrically connect the first input point to the first output point, a second bridge arm arranged to electrically connect the first output point to the second input point, a third bridge arm arranged to electrically connect the first input point to the second output point, and a fourth bridge arm arranged to electrically connect the second output point to the second input point, wherein the first bridge arm includes a first sensor element, an impedance of which changes with a physical quantity to be measured, and the second bridge arm includes a second sensor element, an impedance of which changes with the physical quantity to be measured, a total impedance of the first and second bridge arms is smaller than that of the third and fourth bridge arms, and also including a first balancing variable resistor, which is connected in series between the first and second sensor elements, and the first output point is connected to the first balancing variable resistor, and a second balancing variable resistor, which is connected in series between the third and fourth bridge arms, the second output point is connected to the second balancing variable resistor, and each of the first and second sensor elements is a magnetostrictive sensor element, an impedance of which changes according to a given load, and the physical quantity to be measured is a load that has been placed on one of the first and second sensor elements, the method comprising the steps of:
   a) minimizing the amplitude of a differential voltage between the first and second output points by adjusting one of the first and second balancing variable resistors with the physical quantity to be sensed by the first and second sensor elements decreased to zero; and
   b) minimizing the amplitude of the differential voltage between the first and second output points by adjusting the other of the first and second balancing variable resistors with zero physical quantity applied to the first and second sensor elements.

16. The method of claim 15, further comprising the step of reducing the differential voltage to a local minimum value by repeatedly performing the steps a) and b).

17. The method of claim 15, wherein the physical quantity sensed is a quantity depending on force that has been applied by an operator on handlebars of a vehicle.

18. The method of claim 17, wherein the vehicle is a jet propelled boat.

19. The method of claim 15, wherein the physical quantity sensing device senses a steering torque.

* * * * *